Dec. 20, 1960   R. A. GARRISON   2,964,909
FLUID OPERATED BOOSTER
Filed April 6, 1959
2 Sheets-Sheet 1
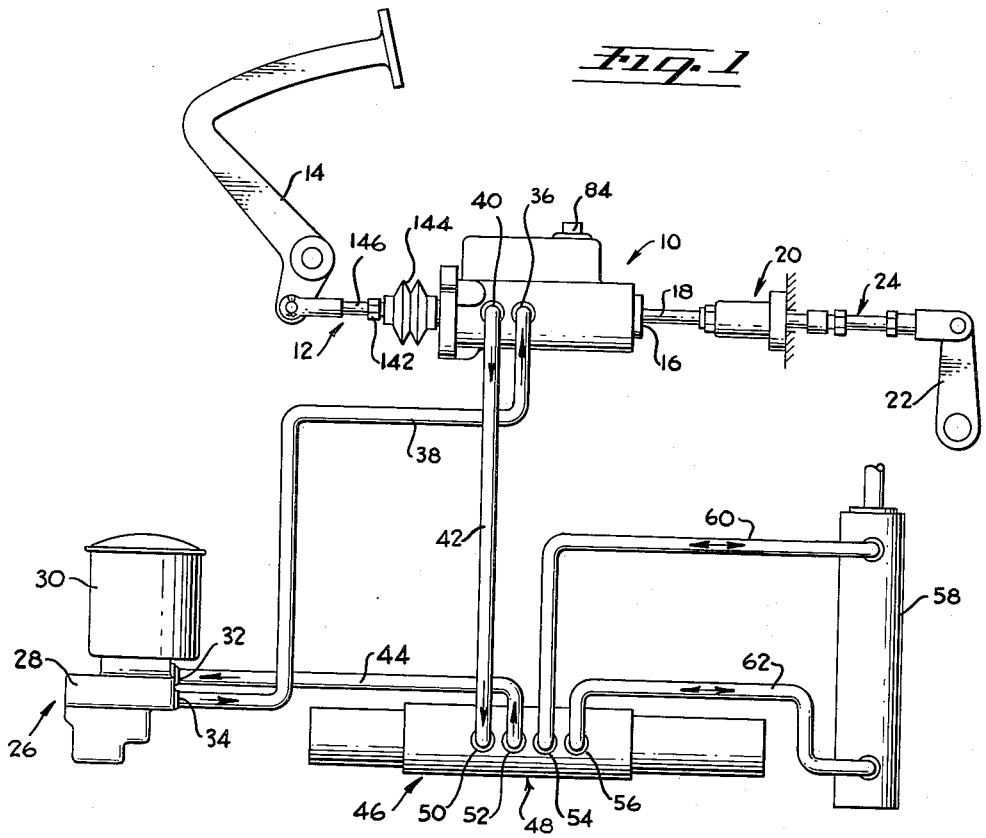
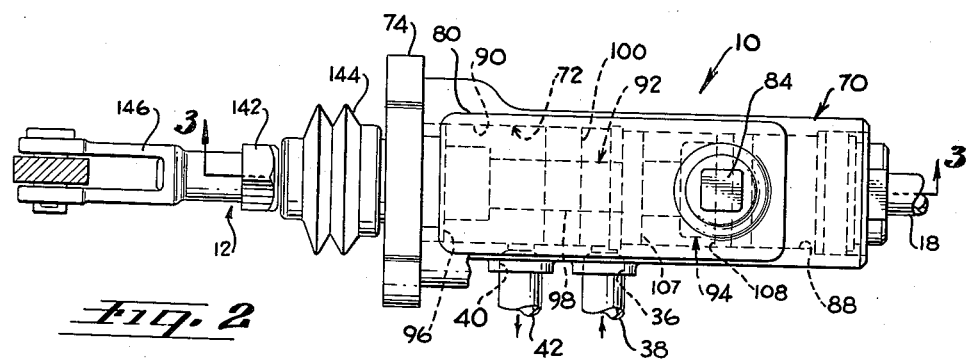
INVENTOR.
ROBERT A. GARRISON
BY HIS ATTORNEYS
HARRIS, KIECH, RUSSELL & KERN

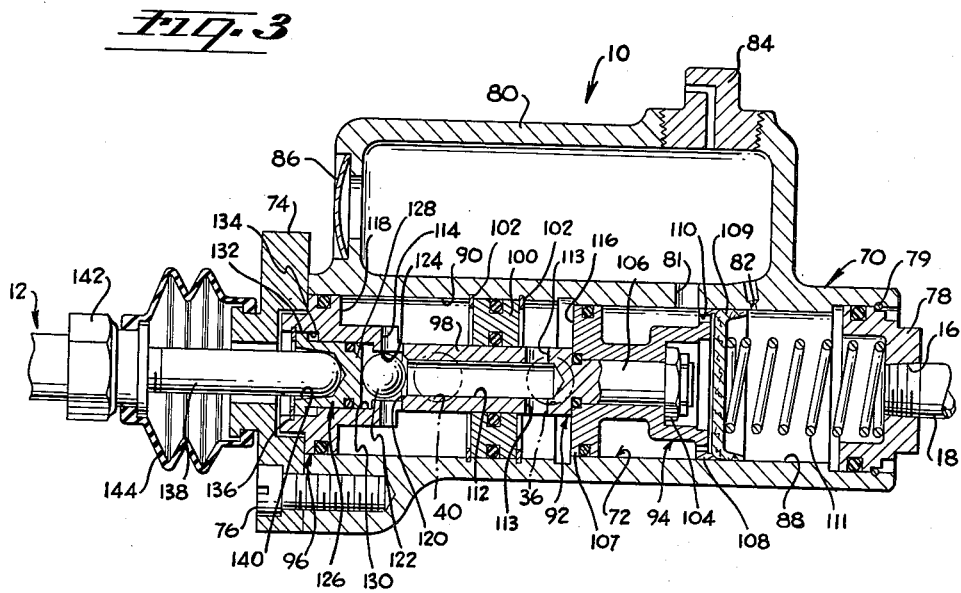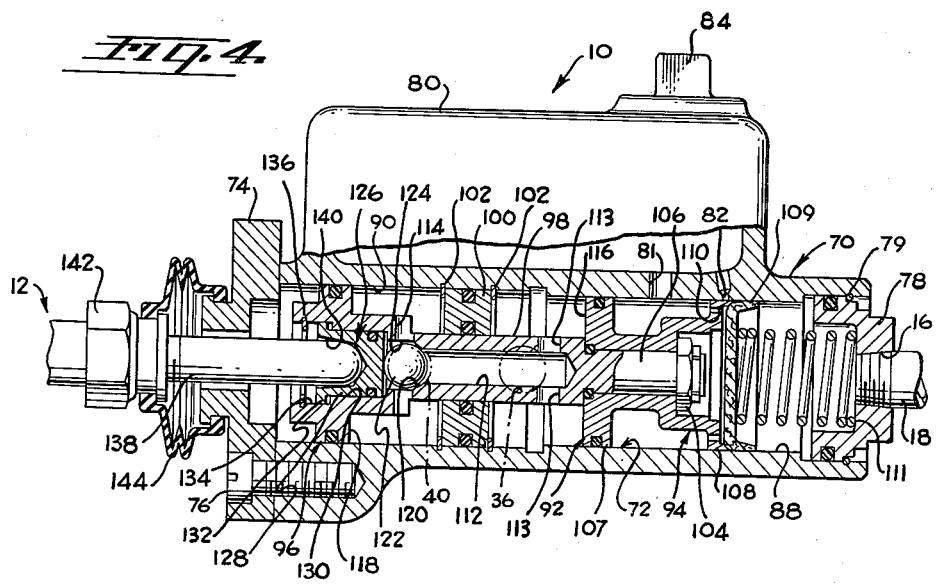

United States Patent Office 2,964,909
Patented Dec. 20, 1960

2,964,909

FLUID OPERATED BOOSTER

Robert A. Garrison, 2645 Wallingford Road,
San Marino, Calif.

Filed Apr. 6, 1959, Ser. No. 804,508

3 Claims. (Cl. 60—54.6)

The present invention relates in general to fluid operated boosters and, more particularly, to a fluid operated booster of the type wherein the force applied by the operator and the resultant booster force are added together in such a manner that the applied force is always representative of the total, thereby providing the operator with the proper feel.

While the fluid operated booster of the invention may be utilized wherever power-assisted motion is desired, it is of particular utility when utilized to actuate a power clutch, or power brakes, of a truck or other automotive vehicle, and will be considered in such connection herein as a matter of convenience.

In general, the invention contemplates a fluid operated booster which includes a cylinder having therein a piston for discharging actuating fluid from an actuating port adjacent one end of the cylinder, such actuating port being connected to the device to be actuated, such as the power clutch, or the power braking system, hereinbefore mentioned. The piston is displaced to discharge actuating fluid through the actuating port by an operating fluid under pressure which is delivered to the cylinder through an inlet port and exhausted therefrom through an outlet port, the application of the operating fluid pressure to the piston being controlled by the force applied by the operator.

The primary object of the invention is to provide a fluid operated booster of the foregoing type wherein the operating fluid pressure biases the piston in a direction away from the actuating port when no force is applied by the operator, but biases the piston toward the actuating port to discharge actuating fluid therefrom in response to an applied force of predetermined magnitude.

More particularly, an important object of the invention is to provide a piston having two oppositely facing areas of different size the larger of which faces the actuating-port end of the cylinder, and to provide means for applying the operating fluid pressure to both of these areas when no discharge from the actuating port is desired, and for applying the full operating fluid pressure to the smaller area only when discharge of fluid from the actuating port is desired. With this construction, when the operating fluid pressure is applied to both of the areas mentioned, the piston is moved away from the actuating-port end of the cylinder, but when the pressure applied to the larger area is reduced below a predetermined minimum, the operating fluid pressure acting on the smaller area biases the piston toward the actuating-port end of the cylinder to discharge fluid through the actuating port.

Another object is to provide a construction wherein the smaller and larger areas of the piston respectively communicate with the inlet and outlet ports for operating fluid and are connected by a passage means in the piston, this passage means being controlled by a valve means carried by the piston. With this construction, when the valve means is closed, or partially closed, by an operating means controlled by the operator, the piston is displaced toward the actuating-port end of the cylinder to discharge fluid through the actuating port. However, when the valve means in question is open, the operating fluid pressure is applied to both areas of the piston to bias it away from the actuating-port end of the cylinder.

Another object of the invention is to provide a valve means which is so constructed that closing movement thereof is resisted by a pressure force which is a function of the pressure developed in the actuating fluid by the piston so as to provide the operator of the booster with the desired feel.

A further object is to provide a booster wherein the manual operating means is connected directly to the piston when the valve means is fully closed so that the applied manual force is added directly to the pressure force developed by the booster.

As hereinbefore indicated, the fluid operated booster of the invention finds particular utility as an actuator for a power operated clutch or brake of a truck, or other heavy duty automotive-type vehicle, and an object of the invention is to provide a system wherein the booster is supplied with operating fluid under pressure by the same source, such as a pump, which supplies a fluid operated power steering means of the vehicle.

An important object of the invention is to connect the fluid operated booster and the fluid operated steering means in series with the booster between the pump and the steering means. With this construction, utilization of a single pump to supply operating fluid under pressure to both the booster and the steering means is possible and, at the same time, an adequate supply of operating fluid is available to the booster to actuate the clutch of the vehicle whenever necessary, which is an important feature.

The foregoing objects, advantages, features and results of the present invention, together with various other objects, advantages, features and results thereof which will be evident to those skilled in the art in the light of this disclosure, may be attained with the exemplary embodiment of the invention described in detail hereinafter and illustrated in the accompanying drawings, in which:

Fig. 1 is a diagrammatic view of a vehicle control system which embodies the invention;

Fig. 2 is a plan view of the fluid operated booster of the invention;

Fig. 3 is a sectional view taken along the arrowed line 3—3 of Fig. 2; and

Fig. 4 is an enlarged sectional view duplicating a portion of Fig. 3, but illustrating various parts in different operating positions.

Referring particularly to Fig. 1 of the drawings, the fluid operated booster of the invention is designated generally by the numeral 10 and includes an operating means 12 which is shown as connected to a clutch pedal 14 of a truck, or similar vehicle. When the pedal 14 is depressed by the driver's foot, the booster 10 discharges an actuating fluid under pressure through an actuating port 16, best shown in Figs. 3 and 4, into a line 18 leading to a fluid motor 20. The latter is provided therein with a piston, not shown, which is connected to a clutch actuating lever 22 by a link means 24. The booster 10 is supplied with operating fluid under pressure by a pump assembly 26 driven by the motor, not shown, of the vehicle in the usual manner, the pump assembly including a pump 28 and a reservoir 30. The pump 28 is provided with an inlet 32 and an outlet 34, the latter being connected to an inlet port 36, best shown in Figs. 2 to 4, of the booster 10 by a line 38. The booster 10 is provided with an outlet port 40, best shown in Figs. 2 to 4, which is connected to the inlet 32 of the pump 28 by lines 42 and 44 through a fluid operated power steering means designated generally by the numeral 46.

The steering means 46 includes a control valve 48 having an inlet port 50 communicating with the line 42 from the booster 10 and an outlet port 52 communicating with the line 44 to the inlet 32 of the pump 28. The control valve 48 is also provided with two operating ports 54 and 56 respectively connected to opposite ends of a fluid motor 58 of the reciprocating type by lines 60 and 62.

As is well known in the art, the fluid motor 58 is connected to the steering mechanism of the vehicle in such a manner as to steer, or to assist in steering, the steerable wheels of the vehicle, and the control valve 48 is so connected to the steering mechanism that it responds to steering forces applied by the driver to operate the fluid motor 58 in directions to amplify the steering forces. Examples of fluid operated power steering means incorporating control valves and fluid motors similar to the control valve 48 and the fluid motor 58 may be found in my Patents Nos. Re. 23,867, reissued September 14, 1954, and 2,824,447, issued February 25, 1958.

As will be apparent, the foregoing system permits the use of the single pump assembly 26 to supply both the fluid operated booster 10 and the fluid operated steering means 46 with operating fluid under pressure, which is an important feature. Since the booster 10 is connected in series with the steering means 46 and the pump 28 ahead of the steering means, the booster is assured of an adequate supply of operating fluid under pressure whenever actuation of the clutch of the vehicle is necessary, which is also an important feature. Since the booster 10 is located in the system ahead of the steering means 46, there is a slight tendency to "starve" the steering means whenever the booster 10 is operated to actuate the clutch of the vehicle. However, such starving of the steering means is only of momentary duration, because of the fact that the booster 10 has a lower displacement than and operates at a lower pressure than the steering means 46, and has only a barely perceptible effect on the steering characteristics of the vehicle. Thus, the invention achieves the advantages resulting from operating both the booster 10 and the steering means 46 off the same pump 28 with no deleterious effects on steering characteristics, which is an important feature.

Turning now to a detailed consideration of the booster 10, it includes a housing 70 provided with a cylinder 72 therethrough, one end of the cylinder being covered by a closure 74 which is secured by screws 76 and through which the operating means 12 extends, and the other end of the cylinder being closed by a plug 78 which is held therein by a snap ring 79 and in which the actuating port 16 is formed. The inlet and outlet ports 36 and 40 are formed in the side of the cylinder 72 and are spaced apart longitudinally thereof, the inlet port 36 being between the outlet port 40 and the actuating port 16.

The housing 70 includes a reservoir 80 which communicates with the interior of the cylinder 72 adjacent the actuating-port end thereof through a relatively large port 81 and a restricted port 82, the latter being between the ports 81 and 16. The reservoir 80 is provided with the usual vented filling plug 84 and expansion plug 86.

The cylinder 72 comprises minor and major bores 88 and 90 and reciprocable in the cylinder is a piston 92 which includes minor and major piston elements 94 and 96 respectively reciprocable in the minor and major bores 88 and 90. The minor piston element 94 is disposed between the actuating port 16 and the inlet port 36 and the major piston element 96 is disposed between the outlet port 40 and the end of the cylinder 72 opposite the actuating-port end thereof. The minor and major piston elements 94 and 96 are connected by a stem or rod 98 which is reciprocable in an annular partition disposed in the major bore 90 between the inlet and outlet ports 36 and 40 and held therein by snap rings 102. This construction simplifies manufacture since the cylinder 72 comprises only the minor and major bores 88 and 90, the bore necessary for the piston rod 98 being provided by the annular partition 100. In the construction shown, the major piston element 96 and the piston rod 98 are integral and the minor piston element 94 is a separate element seated against the adjacent end of the piston rod and secured by a nut 104 threaded on a stud 106 integral with the piston rod.

The minor piston element 94 includes two axially spaced heads 107 and 108, the latter having seated thereon a flexible cup seal 109 which faces the actuating port 16, and being provided with ports 110 therethrough behind the seal 109. The piston 92 is biased away from the actuating-port end of the cylinder 72 by a compression coil spring 111 seated at one end against the cup seal 109 and at its other end against the plug 78.

As will be apparent, when the piston 92 is moved toward the actuating-port end of the cylinder 72 in a manner to be described, actuating fluid between the cup seal 109 and the plug 78 is discharged through the actuating port 16 and is delivered to the fluid motor 20 to actuate the clutch controlled by the lever 22.

It will be apparent that the cup seal 109 acts as a check valve which prevents back flow into the reservoir 80 during movement of the piston 92 toward the actuating-port end of the cylinder 72, and which permits flow from the reservoir into the space between the piston 92 and the plug 78 during movement of the piston away from the actuating-port end of the cylinder whenever replacement of actuating fluid lost through leakage is necessary. More specifically, it will be apparent that when the piston 92 is moved from the position shown in Fig. 3 a short distance toward the plug 78, the seal 109 covers the restricted port 82 so that further piston movement toward the right discharges fluid from the actuating port 16 without loss through the restricted port 82, there being a slight loss through this port prior to covering thereof by the seal 109. However, this loss is very small due to the restricted nature of the port 82. During movement of the piston 92 away from the actuating-port end of the cylinder 72 and toward the position shown in Fig. 3, the seal 109 permits flow therepast from the reservoir 80, by way of the port 81 and the ports 110, to insure that the space between the seal 109 and the plug 78 is completely filled if replacement of fluid lost by leakage is necessary. Once the seal 109 uncovers the restricted port 82, fluid is also drawn into the space in question through this port as the piston 92 moves into the position of Fig. 3.

As will become apparent, the left side of the piston element head 107 is subjected to the pressure of the operating fluid from the pump 28 when the booster 10 is in operation. With the construction hereinbefore described, any leakage of operating fluid across the piston element head 107 escapes into the reservoir 80 through the port 81, this port being between the piston element heads 107 and 108 in all positions of the piston 92. Thus, leakage of operating fluid across the piston element head 107 can exert no back pressure on the head 107, which is an important feature.

Considering the manner in which the piston 92 is displaced toward the actuating-port end of the cylinder 72 to actuate the clutch, or other device, with which the booster 10 is used, the piston rod 98 is provided therein with an axial bore 112 which communicates at one end with the inlet port 36 through radial ports 113 and at its other end with the outlet port 40 through radial ports 114. The minor piston element 94 is provided with a minor annular area 116 which faces away from the actuating-port end of the cylinder 72 and which is exposed to the operating fluid pressure in the inlet port 36. The major piston element 96 is provided with a major annular area 118 which faces toward the actuating-port end of the cylinder 72, and toward the minor annular area 116, and which is exposed to the pressure in the outlet port 40. As will be apparent, the minor and major areas 116 and 118 result from utilizing the minor and major piston elements 94 and 96 with a piston rod 98 of constant diameter, the difference between the minor and major areas 116 and 118 being equal to the difference between the cross sectional areas of the minor and major bores 88 and 90.

Because of the fact that the major area 118 is larger than the minor area 116, the piston 92 is biased in a direction away from the actuating-port end of the cylinder 72 when the operating fluid pressure in the inlet port 36 is applied to both of these areas, this action being augmented by the action of the spring 111. As will be apparent, the operating fluid pressure in the inlet port 36 acts on both the minor and major areas 116 and 118 when the passage means through the piston 92 which is provided by the bore 112 and the ports 113 and 114 is open. However, when this passage means is closed, or partially closed, so that flow therethrough from the inlet port 36 to the outlet port 40 is cut off, or throttled substantially, the pressure acting on the major area 118 is reduced sufficiently that the full operating pressure acting on the minor area 116 moves the piston 92 toward the actuating-port end of the cylinder 72 in opposition to the action of the spring 111, thereby discharging the actuating fluid through the actuating port 16. The reduction in the pressure applied to the major area 118 which is necessary to produce movement of the piston 92 toward the actuating-port end of the cylinder 72 depends on the size differential between the minor and major areas 116 and 118, which may be selected to give the desired operating characteristics.

Considering how the passage means through the piston 92 is closed, or partially closed, to reduce the pressure acting on the major area 118 to a value sufficiently less than the full operating fluid pressure acting on the minor area 116 to produce movement of the piston 92 toward the actuating-port end of the cylinder 72, the bore 112 is provided with a valve seat 120 which faces axially away from the actuating-port end of the cylinder 72 and which is engageable by a valve element 122, the latter being a ball disposed in a counterbore 124 in the piston 92 in the construction illustrated. The valve ball 122 is movable toward the actuating-port end of the cylinder 72, and thus toward its seat 120, by a plunger 126 having a body portion 128 disposed in a counterbore 130 in the piston 92 and having a head portion 132 disposed in a counterbore 134 therein. The plunger 126 has limited movement relative to the piston 92, movement of the plunger toward the actuating-port end of the cylinder 72 being limited by engagement of the body and head portions 128 and 132 with annular shoulders at the bottoms of the counterbores 130 and 134 respectively, and movement of the plunger away from the actuating-port end of the cylinder being limited by a snap ring 136 disposed in the counterbore 134. As will be apparent, when the plunger 126 is displaced relative to the piston 92 toward the actuating-port end of the cylinder 72, the valve ball 122 is in engagement with its seat 120, and when the plunger 126 engages the snap ring 136, the valve ball is in its fully open position. As will be apparent, the full operating fluid pressure in the inlet port 36 acts on the valve ball 122 at all times to bias it toward its fully open position, at the same time biasing the plunger 126 away from the actuating-port end of the cylinder 72.

The plunger 126 is adapted to be moved toward the actuating-port end of the cylinder 72, to move the valve ball 122 towards its seat 120, by the operating means 12, which includes a rod 138 extending through the closure 74 into a socket 140 in the plunger. Threaded on the rod 138 is a nut 142 which is engageable with the closure 74 to limit movement of the rod toward the actuating-port end of the cylinder 72, the exposed portion of the rod being enclosed by a bellows 144 which is connected at its ends to the nut 142 and the closure 74, respectively. Also threaded on the rod 138 outwardly of the nut 142 is a clevis 146 which is adapted to be connected to a manual operating means for the booster 10, such as the clutch pedal 14.

*Operation*

Considering the over-all operation of the booster 10, the valve ball 122 is normally held in its fully open position by the operating fluid pressure acting thereon, the operating fluid thus flowing through the booster 10 from the inlet port 36 to the outlet port 40. Consequently, the full operating fluid pressure acts on both the minor and major areas 116 and 118 so that the piston 92 occupies a position remote from the actuating-port end of the cylinder 72.

When it is desired to utilize the booster 10 to actuate some device, such as the clutch actuating fluid motor 20, the operating means 12 is moved toward the actuating-port end of the cylinder 72 to move the valve ball 122 toward its seat 120. As the valve ball 122 is moved toward its seat 120 in this fashion, a point is reached where the pressure acting on the major area 118 is reduced sufficiently below the full operating fluid pressure acting on the minor area 116 that the spring 111 is overcome, whereupon the piston 92 is displaced toward the actuating-port of the cylinder 72 to discharge actuating fluid through the actuating port 16. Under some conditions, the necessary actuating fluid pressure may be achieved by only partially closing the valve means formed by the valve ball 122 and its seat 120. However, under other conditions, a higher required actuating fluid pressure may necessitate complete closure of the valve means, i.e., seating of the valve ball 122. Under these conditions, the plunger 126 "bottoms" so that the applied manual force is communicated directly to the piston 92 and is added directly to the pressure force differential acting thereon.

It will be noted that it is necessary to apply a progressively increasing force to the valve ball 122 as it approaches its seat 120, due to the increasing pressure differential thereacross as it approaches its seat. Since the pressure differential across the valve ball 122 is a function of the pressure force differential acting on the piston 92, it will be apparent that the applied manual force is a function of the pressure force differential acting on the piston so that proper feel is provided. Also, since the plunger 126 "bottoms" when the valve ball 122 is seated, the device is operative to pressurize the actuating fluid manually if the supply of operating fluid under pressure should fail for any reason, such as failure of the pump 28, for example.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:

1. In a fluid operated booster, the combination of: a housing providing cylinder means therein and having therein inlet and outlet ports which communicate with said cylinder means; piston means reciprocable in said cylinder means and having oppositely facing, major and minor areas respectively communicating with said outlet and inlet ports; passage means in said piston means and interconnecting said major and minor areas and said outlet and inlet ports; valve means in said passage means and carried by said piston means for regulating fluid flow through said passage means from said inlet port to said outlet port, said valve means including a valve seat facing in the same direction as said minor area and including a valve element movable toward said valve seat to increase the restriction to fluid flow through said passage means; and operating means movable axially of said piston means toward said valve seat for moving said valve element toward said valve seat, the force applied to said valve element by said operating means in moving said valve element toward said valve seat being in the same direction as the force applied to said minor area by the fluid pressure in said inlet port because of the fact that said valve seat and said minor area face in the same direction.

2. In a fluid operated booster, the combination of: a housing providing cylinder means therein and having therein inlet and outlet ports which communicate with said cylinder means; piston means reciprocable in said cylinder means and having oppositely facing, major and minor areas respectively communicating with said outlet and inlet ports, said major and minor areas being annular areas which face each other; passage means in said piston means and interconnecting said major and minor areas and said outlet and inlet ports; valve means in said passage means and carried by said piston means for regulating fluid flow through said passage means from said inlet port to said outlet port, said valve means including a valve seat facing in the same direction as said minor area and including a valve element movable toward said valve seat and against the fluid pressure in said inlet port to increase the restriction to fluid flow through said passage means; and operating means movable axially of said piston means toward said valve seat for moving said valve element toward said valve seat, the force applied to said valve element by said operating means in moving said valve element toward said valve seat being in the same direction as the force applied to said minor area by the fluid pressure in said inlet port because of the fact that said valve seat and said minor area face in the same direction.

3. A fluid operated booster as set forth in claim 2 wherein said housing is provided with an actuating port in communication with said cylinder means and wherein said piston means is provided with another area facing in said opposite direction and facing said actuating port.

References Cited in the file of this patent

UNITED STATES PATENTS

| | | |
|---|---|---|
| 1,890,010 | Vickers | Dec. 6, 1932 |
| 1,960,996 | Guernsey | May 29, 1934 |
| 2,318,756 | Chouings | May 11, 1943 |
| 2,517,005 | MacDuff | Aug. 1, 1950 |
| 2,536,461 | Price | Jan. 2, 1951 |
| 2,846,850 | Hall | Aug. 12, 1958 |
| 2,902,829 | Verbrugge | Sept. 8, 1959 |
| 2,913,877 | Stelzer | Nov. 24, 1959 |

FOREIGN PATENTS

| | | |
|---|---|---|
| 541,233 | Great Britain | Nov. 19, 1941 |